(12) United States Patent
Watanabe et al.

(10) Patent No.: US 10,020,104 B2
(45) Date of Patent: Jul. 10, 2018

(54) MAGNETIC SHEET, ELECTRONIC DEVICE USING SAME, AND METHOD FOR MANUFACTURING MAGNETIC SHEET

(71) Applicant: HITACHI METALS, LTD., Tokyo (JP)

(72) Inventors: Mitsuhiro Watanabe, Mishima-gun (JP); Hirohiko Miki, Mishima-gun (JP); Masaki Nakamura, Mishima-gun (JP)

(73) Assignee: HITACHI METALS, LTD., Tokyo (JP)

( * ) Notice: Subject to any disclaimer, the term of this patent is extended or adjusted under 35 U.S.C. 154(b) by 143 days.

(21) Appl. No.: 14/780,188

(22) PCT Filed: Mar. 27, 2014

(86) PCT No.: PCT/JP2014/058879
§ 371 (c)(1),
(2) Date: Sep. 25, 2015

(87) PCT Pub. No.: WO2014/157526
PCT Pub. Date: Oct. 2, 2014

(65) Prior Publication Data
US 2016/0055952 A1 Feb. 25, 2016

(30) Foreign Application Priority Data
Mar. 28, 2013 (JP) .................................. 2013-068373

(51) Int. Cl.
*H01F 10/26* (2006.01)
*H01F 1/16* (2006.01)
(Continued)

(52) U.S. Cl.
CPC .............. *H01F 10/26* (2013.01); *G01C 17/28* (2013.01); *H01F 1/16* (2013.01); *H01F 10/14* (2013.01);
(Continued)

(58) Field of Classification Search
None
See application file for complete search history.

(56) References Cited

U.S. PATENT DOCUMENTS 5,439,534 A 8/1995 Takeuchi et al.
5,731,666 A * 3/1998 Folker .................... H05B 41/28
315/276

(Continued)

FOREIGN PATENT DOCUMENTS

JP 4-275409 A 10/1992
JP 5-82373 A 4/1993
(Continued)

OTHER PUBLICATIONS

Communication dated Oct. 31, 2016, from the European Patent Office in counterpart European application No. 14772811.7.
(Continued)

*Primary Examiner* — Kevin M Bernatz
(74) *Attorney, Agent, or Firm* — Sughrue Mion, PLLC

(57) ABSTRACT

Provided is a magnetic sheet including a resin film and a thin sheet-shaped magnetic body adhered to the resin film by an adhesive layer sandwiched between the thin sheet-shaped magnetic body and the resin film. The thin sheet-shaped magnetic body is made from an Fe-based metal magnetic material, has a thickness of 15 μm to 35 μm, and has an AC relative magnetic permeability ($\mu_r$) in the range of 220 to 770 at a frequency of 500 kHz.

8 Claims, 6 Drawing Sheets

(51) Int. Cl.
G01C 17/28 (2006.01)
H01F 10/14 (2006.01)
H01F 1/147 (2006.01)
H01F 27/36 (2006.01)

(52) U.S. Cl.
CPC ........ H01F 1/14775 (2013.01); H01F 10/142 (2013.01); H01F 27/365 (2013.01)

(56) References Cited

U.S. PATENT DOCUMENTS

| | | | | |
|---|---|---|---|---|
| 5,850,336 | A | * | 12/1998 | Nakajima ............... H01F 1/153 148/307 |
| 2006/0118207 | A1 | * | 6/2006 | Yoshizawa .......... H01F 1/15316 148/307 |
| 2007/0194781 | A1 | * | 8/2007 | Zhitomirskiy ......... G01D 5/204 324/207.17 |
| 2008/0196795 | A1 | * | 8/2008 | Waeckerle ............. H01F 1/153 148/540 |
| 2010/0000769 | A1 | | 1/2010 | Ohmi et al. |
| 2010/0108196 | A1 | * | 5/2010 | Ohta ..................... C21D 8/1211 148/121 |
| 2012/0062435 | A1 | | 3/2012 | Kato et al. |
| 2012/0306824 | A1 | | 12/2012 | Horie |
| 2014/0362505 | A1 | * | 12/2014 | Jang ..................... H05K 9/0075 361/679.4 |
| 2015/0124402 | A1 | * | 5/2015 | Jang ....................... B32B 27/08 361/679.55 |

FOREIGN PATENT DOCUMENTS

| | | |
|---|---|---|
| JP | 6-149450 A | 5/1994 |
| JP | 2952716 B2 | 9/1999 |
| JP | 2005-228951 A | 8/2005 |
| JP | 2007-123575 A | 5/2007 |
| JP | 2008-112830 A | 5/2008 |
| JP | 2009-182062 A | 8/2009 |
| JP | 2011-049406 A | 3/2011 |
| JP | 2011-211337 A | 10/2011 |
| JP | 2012-252660 A | 12/2012 |
| KR | 10-2009-0103951 A | 10/2009 |
| KR | 10-2012-0053221 A | 5/2012 |

OTHER PUBLICATIONS

Communication dated Dec. 19, 2016 from the Korean Intellectual Property Office in counterpart Application No. 10-2015-7027139.
Communication dated Feb. 24, 2017 from the State Intellectual Property Office of the P.R.C. in counterpart Application No. 201480017811.0.
International Search Report for PCT/JP2014/58879 dated Jun. 24, 2014.
International Preliminary Report on Patentability dated Oct. 8, 2015, for International Application No. PCT/JP2014/058879 filed Mar. 27, 2014, 9 pages.
Communication dated Feb. 6, 2018 from the Japanese Patent Office in counterpart Application No. 2015-508700.

* cited by examiner (a)

(b)

(a)

(b)

(c)

(d)

MAGNETIC SHEET, ELECTRONIC DEVICE USING SAME, AND METHOD FOR MANUFACTURING MAGNETIC SHEET

CROSS REFERENCE TO RELATED APPLICATIONS

This application is a National Stage of International Application No. PCT/JP2014/058879 filed Mar. 27, 2014 (claiming priority based on Japanese Patent Application No. 2013-068373, filed Mar. 28, 2013), the contents of which are incorporated herein by reference in their entirety.

TECHNICAL FIELD

The present invention relates to a magnetic sheet used for an electronic device in which an electronic compass including a geomagnetic sensor is disposed, for example, a mobile phone or the like, an electronic device using the same, and a method for manufacturing the magnetic sheet.

BACKGROUND ART

An electronic device such as a smart phone, a tablet type information terminal, or a mobile phone has rapidly spread in recent years. FIG. 11 is an appearance perspective view of an electronic device, a smart phone as an example. An electronic device 200 has various functions besides a telephone call function. Examples of the functions include a map display function using GPS. A map display function using map information and GPS signals stored in a hard disk or an IC memory allows a user to obtain exact position information on a display 300 provided on the electronic device. At this time, when information on a direction to which the user faces is reflected in the map display function, an electronic compass 260 including a geomagnetic sensor is used. The electronic compass 260 provides direction information based on a direct-current magnetic field according to geomagnetism using a geomagnetic sensor such as a hole device and a magnetoresistance effect element.

A position detecting device as an inputting device in which a user can easily put operation information and character information is employed for the electronic device 200 such as a smart phone or a tablet.

The position detecting device is obtained by combining a pen type device 210 for dictating a position with a device referred to as a sensor substrate for detecting a position, for example. A specific example of a position detecting device is shown in FIG. 12. A pulse signal having a frequency of 500 kHz is applied to a coil group 340 including sensor coils for X and Y directions provided on the sensor substrate 350 side from a coil provided in the pen type device 210. Position information is obtained by an electromotive force generated in the coil group 340 according to the principle of electromagnetic induction. In the electronic device 200, the sensor substrate 350 is provided below a display panel 305, and various softwares are coordinated with the position information on the display, which provides easy input of information to the electronic device 200. A magnetic body member 360 as a magnetic yoke or a magnetic shield is disposed so as to cover the whole lower part of the display panel 305 between the sensor substrate 350 and a circuit substrate 370.

In another constitution, a sensor substrate 350 in which a coil group 340 which cannot be visually confirmed is formed on a light transmissive substrate may be provided on the upper side of a display panel 305, and a magnetic body member 360 may be disposed between the display panel 305 and a circuit substrate 370.

A magnetic body member may be disposed as a magnetic shield in an electronic device irrespective of the presence or absence of a sensor substrate.

Since an electronic compass uses small geomagnetism, the electronic compass is known to be apt to be influenced by a magnetic noise generated by a part having a magnet such as a speaker. However, the magnetic body member also is recognized to largely influence the direction information of the electronic compass. Specifically, a direct-current magnetic field according to geomagnetism is deflected near the magnetic body member. For this reason, when the electronic compass is disposed near the magnetic body member, the error of the direction information of the electronic compass is increased, it is confirmed that there are cases where the right direction is not obtained.

Patent Document 1 proposes that a magnetic body member itself having a low magnetic permeability is produced by forming a magnetic material such as an amorphous metal in a powder state, and hardening the magnetic material by a resin or forming a coating material containing the magnetic material in order to address the problem. When the magnetic body member has a low magnetic permeability, a disordered magnetic flux near the magnetic body member is also relatively decreased. Therefore, even when an electronic compass is positioned close to the magnetic body member, the error of direction information to be obtained can be decreased.

Patent Document 2 describes that a powdered magnetic material is used in a state where the magnetic material is dispersed in a rubber or a resin for a magnetic body member used for a sensor substrate as in Patent Document 1.

PRIOR ART DOCUMENTS

Patent Documents

Patent Document 1: JP-A-2012-252660
Patent Document 2: JP-A-6-149450

SUMMARY OF THE INVENTION

Problems to be Solved by the Invention

In order to suppress the influence of the deflection of the direct-current magnetic field by the magnetic body member, the magnetic body member and the electronic compass are preferably disposed apart from each other. However, various parts are densely integrated in a limited space in an electronic device such as a mobile terminal device by the requests of multifunctionalization and miniaturization of a portable device, which causes the limitation of the freedom degree of a layout. Therefore, in fact, there is no alternative but to dispose the magnetic body member and the electronic compass closely to each other.

When the magnetic powder is dispersed in the resin as described in Patent Documents 1 and 2, the error of the direction information of the electronic compass is reduced by decreasing the magnetic permeability of the magnetic body member. Since flexibility can be applied to the magnetic body member, the magnetic body member is easily disposed also in a region which is not a flat face, which is preferable. However, since a process for powderizing a magnetic material such as an amorphous alloy, a process for dispersing the powderized magnetic material in a resin or the like and forming the resin containing the powderized magnetic material in a predetermined shape, and a process for applying the resin are required, the magnetic body member is relatively expensive.

In addition, the magnetic body member obtained from the above-mentioned magnetic powder has a relative magnetic permeability of at most about 150. Even when the magnetic body member is used for the magnetic yoke or the like of the position detecting device, the sensor substrate has a poor detection sensitivity, which may not provide right position information. An increase in the thickness of the magnetic body member obtained from the powder can improve the detection sensitivity in some degree. However, this causes an increase in the volume, and is less likely to provide the flexibility, which is not preferable in a limited space.

Then, it is an object of the present invention to provide a magnetic sheet including a magnetic body member, used with an electronic compass in an electronic device, having flexibility, capable of suppressing the direction error of the electronic compass, and suitable for being used with a sensor substrate in a position detecting device, an electronic device using the same, and a method for manufacturing the magnetic sheet.

Means for Solving the Problems

The first invention is a magnetic sheet including a resin film and a thin sheet-shaped magnetic body as a magnetic body member. The thin sheet-shaped magnetic body is held on the resin film with an adhesive layer sandwiched between the thin sheet-shaped magnetic body and the resin film. The thin sheet-shaped magnetic body is made from an Fe-based metal magnetic material. The thin sheet-shaped magnetic body has a thickness of 15 μm to 35 μm. The thin sheet-shaped magnetic body has an AC relative magnetic permeability μr of 220 or more and 770 or less at a frequency of 500 kHz.

The thin sheet-shaped magnetic body may be a metal thin band; the magnetic sheet may be one metal thin band; a plurality of metal thin bands may be applied and disposed next to each other on the surface of the resin film; or the metal thin bands may be stacked and disposed on the surface of the resin film.

The thin sheet-shaped magnetic body is preferably divided into a plurality of pieces while a state where the thin sheet-shaped magnetic body is stuck on the resin film is maintained. The thin sheet-shaped magnetic body is preferably in a non-crack state where the thin sheet-shaped magnetic body is not subjected to a crack treatment in order to simplify a manufacturing process. The thin sheet-shaped magnetic body may be divided into a plurality of pieces by the crack treatment. The crack treatment means a treatment for applying an external force to the magnetic sheet to divide the magnetic sheet into pieces. The crack treatment is distinguished from the case of a non-crack state where a plurality of metal thin bands obtained from the thin sheet-shaped magnetic body are used next to each other, or pieces previously obtained from the thin sheet-shaped magnetic body are set and used.

The second invention is an electronic device including: the magnetic sheet of the first invention; and an electronic compass disposed closely to the magnetic sheet. The electronic compass includes a geomagnetic sensor.

The third invention is a method for manufacturing a magnetic sheet including: a heat treating step of subjecting a thin sheet-shaped magnetic body made from an Fe-based metal magnetic material and having a thickness of 15 μm to 35 μm to a heat treatment to set an AC relative magnetic permeability μr of the thin sheet-shaped magnetic body at a frequency of 500 kHz to 220 or more and 770 or less; a laminating step of holding the thin sheet-shaped magnetic body subjected to the heat treatment on a resin film with an adhesive layer sandwiched between the thin sheet-shaped magnetic body and the resin film, to constitute the magnetic sheet; and a cutting step of cutting the magnetic sheet into a predetermined shape.

In the heat treating step, the thin sheet-shaped magnetic body is preferably subjected to the heat treatment in a state where the thin sheet-shaped magnetic body is made annular.

The method may further includes a step of applying an external force to a plurality of places on a surface of the magnetic sheet after the laminating step; and a step of producing cracks starting from the places which the external force is applied, by winding the magnetic sheet around a roll, to divide the thin sheet-shaped magnetic body into a plurality of pieces. In that case, the step of applying an external force to a plurality of places on a surface of the magnetic sheet is preferably performed simultaneously with the cutting step.

Effect of the Invention

A magnetic sheet of the present invention is suitably used with a sensor substrate in a position detecting device, and can suppress a direction error caused by a magnetic body member constituting the magnetic sheet in an electronic compass disposed closely to the magnetic sheet in an electronic device. The electronic device including the magnetic sheet of the present invention provides more exact direction information. A method for manufacturing the magnetic sheet of the present invention is useful for manufacturing the magnetic sheet of the present invention.

MODE FOR CARRYING OUT THE INVENTION

Hereinafter, a magnetic sheet according to the present invention will be specifically described with reference to the drawings, but the present invention is not limited thereto.
(Constitution of Magnetic Sheet)

Figure 1:
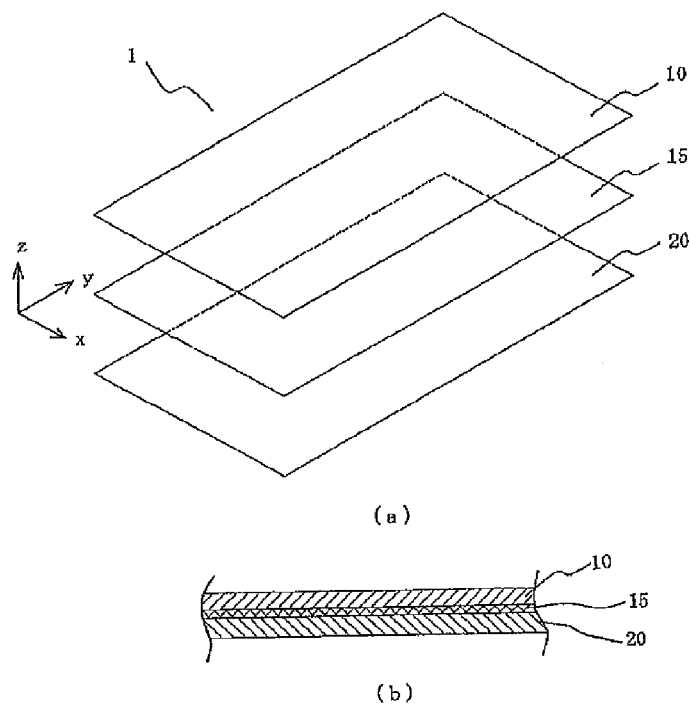
FIG. 1(a) is an exploded perspective view showing a magnetic sheet according to an embodiment of the present invention.
FIG. 1(b) is a sectional view showing a magnetic sheet according to an embodiment of the present invention.

FIG. 1 shows the constitution of a magnetic sheet. FIG. 1(a) shows an exploded perspective view of the magnetic sheet. FIG. 1(b) shows a sectional view of the magnetic sheet. A magnetic sheet according to the present invention includes a plurality of stacked layers including a thin sheet-shaped magnetic body 10 made from an Fe-based metal magnetic material. At least the thin sheet-shaped magnetic body 10 is stuck on a substrate 20 which is a resin sheet with an adhesive layer 15 sandwiched between the thin sheet-shaped magnetic body 10 and the substrate 20.

Most cases of portable devices or the like have a substantially rectangular outer shape. A display attached to the case is also the same. A magnetic sheet 1 disposed below the display also has a rectangle so as to cover the display. Examples of the rectangle herein include, but are not limited to, a square. A penetration hole and a cutout may be partially formed in the rectangle.

The substrate 20 is easily deformed, and a material and a thickness, which are rich in bendability, are selected. For example, a resin film such as a polyethylene terephthalate (PET) film having a thickness of 10 μm to 100 μm is preferable. The substrate 20 may be a resin film made from polyimides such as polyether imide and polyamide imide, polyamides, and polyesters such as polyethylene terephthalate. From the viewpoint of heat resistance and dielectric loss, the polyamides and the polyimides are particularly preferable.

When the thickness of the substrate 20 is increased, the substrate 20 is less likely to be deformed, which may lead to inhibition of disposing of the magnetic sheet 1 along a curved surface and a bent surface. When the thickness is less than 10 μm, the substrate 20 itself is more easily deformed, which makes it difficult to treat the substrate 20, and may not sufficiently provide a function to support the thin sheet-shaped magnetic body 10.

Liquid-like, sheet-like, and tape-like adhesive agents such as an acrylic resin and a silicone resin can be applied to the adhesive layer 15 for sticking the thin sheet-shaped magnetic body 10 on the substrate 20. The liquid-like adhesive may be thinly applied to a surface of the substrate 20, to form an adhesive layer, or a resin sheet to which a double-sided tape is previously stuck may be used. An electric conductor such as a Cu foil or an Al foil having a thickness of about 5 μm to about 30 μm may be provided on a surface opposite to the surface of the substrate 20 on which the thin sheet-shaped magnetic body 10 is stuck, or between the thin sheet-shaped magnetic body 10 and the substrate 20 for the purpose of applying an electromagnetic shielding function.

Figure 2:
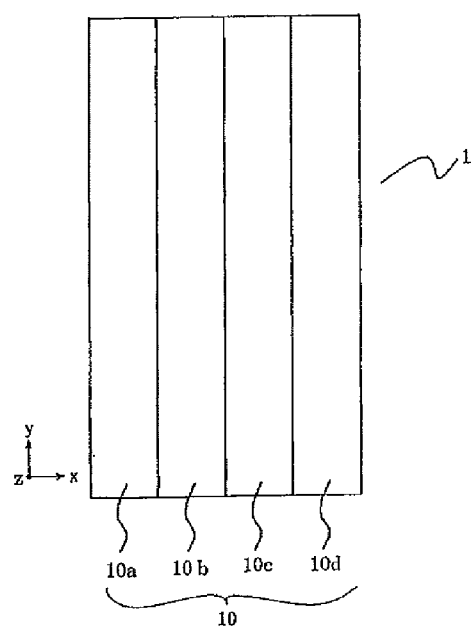
FIG. 2 is a plan view showing a magnetic sheet according to another embodiment of the present invention as viewed from a thin sheet-shaped magnetic body side.

The thin sheet-shaped magnetic body 10 may be used alone for the magnetic sheet 1, or the plurality of thin sheet-shaped magnetic bodies 10 may be used. The thin sheet-shaped magnetic body may be cut to a predetermined width and length, to dispose a plurality of band-like bodies 10a to 10d next to each other on the surface of the substrate as in an aspect shown in the plan view of FIG. 2.

Figure 3:
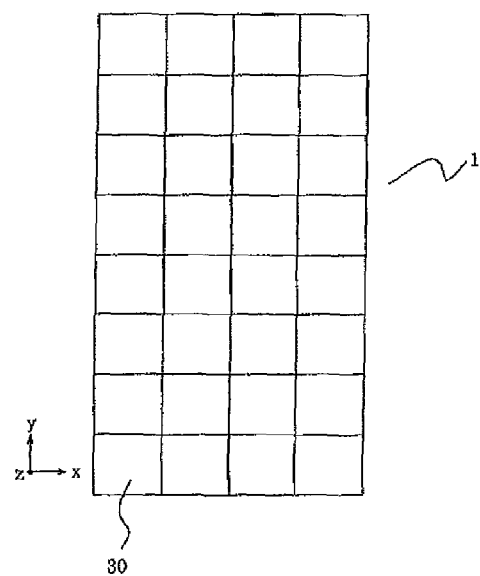
FIG. 3 is a plan view showing a magnetic sheet according to another embodiment of the present invention as viewed from a thin sheet-shaped magnetic body side.

When the plurality of thin sheet-shaped magnetic bodies 10 are used for the magnetic sheet 1, small pieces 30 having a square shape or the like may be produced by cutting the magnetic sheet 1 to a predetermined shape or punching the magnetic sheet 1 as in an aspect shown in FIG. 3 in addition to the band-like body, and may be set at intervals on the surface of the substrate.

Figure 4:
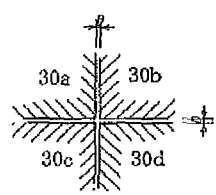
FIG. 4 is a plan view illustrating a state where small pieces of a magnetic body member are disposed in a magnetic sheet according to another embodiment of the present invention.

FIG. 4 is a partial enlarged view showing the set thin sheet-shaped magnetic body. The pieces 30a to 30d of the thin sheet-shaped magnetic body are disposed next to each other at intervals D of 0 mm or more (preferably, more than 0 mm). Herein, the interval D of 0 mm means a state where at least sides of the pieces disposed next to each other are partially brought into contact with each other. The interval D constitutes a magnetic gap. Therefore, when an eddy current produced in the thin sheet-shaped magnetic body 10 causes a problem, the interval D can reduce the influence of the eddy current according to the magnetic gap. On the other hand, an increase in the interval D makes it difficult to provide a function as a yoke or a shield, and causes also deterioration in the detection sensitivity of a sensor substrate when the thin sheet-shaped magnetic body is used for a position detecting device. For this reason, when the plurality of thin sheet-shaped magnetic bodies are disposed next to each other, the interval D is preferably 0.1 mm or less.

The piece preferably has a square shape from the viewpoint of the ease of the formation of the piece. However, the piece may have another polygonal shape, a circle shape, or a shape obtained by combining various shapes. The number of the magnetic gaps formed in the magnetic sheet is changed according to the formation size of the piece. Therefore, when the piece has a square shape, the size of the piece is preferably 10 mm×10 mm or less.

When the thin sheet-shaped magnetic bodies are stacked so that a magnetic path cross-sectional area is increased, the thickness is increased, which makes it difficult to deform the thin sheet-shaped magnetic bodies themselves depending on the degree of the increase. When the thin sheet-shaped magnetic bodies are used as the magnetic sheet, the magnetic sheet may not have flexibility. Considering the fact, the size of the piece is more preferably 3 mm×3 mm or less.

The thin sheet-shaped magnetic body after a heat treatment to be described later is embrittled, which can comparatively easily produce cracks according to pressurization. Therefore, the thin sheet-shaped magnetic body 10 may be divided into a plurality of finite or infinite pieces by subjecting the thin sheet-shaped magnetic body 10 to a crack treatment for applying an external force such as pressurization by a member such as a roller in a state where the thin sheet-shaped magnetic body 10 is held on the substrate 20. In this case, the thin sheet-shaped magnetic body 10 is preferably sandwiched by previously covering the thin sheet-shaped magnetic body 10 with other substrate and a covering layer such as an adhesive layer so that the thin sheet-shaped magnetic body (piece 30) does not fall off from the substrate.

The thin sheet-shaped magnetic body of the magnetic sheet 1 shown in each of FIGS. 1 to 4 is in a non-crack state where the thin sheet-shaped magnetic body is not subjected to a crack treatment, and is not divided into a plurality of pieces by a crack treatment. The non-crack state means a state where intentional cracks produced by a crack treatment are not formed, and includes a state where some cracks merely occur according to usual handling (for example, mere feeding). Since the crack treatment can be omitted in the magnetic sheet, a manufacturing process can be simplified.

The thin sheet-shaped magnetic body 10 is preferably a single layer in order to reduce the thickness of the magnetic sheet 1. However, when a part such as a permanent magnet generating a magnetic field near the magnetic sheet 1 is disposed, a plurality of thin sheet-shaped magnetic bodies may be stacked with an insulating resin layer such as a polyimide resin sandwiched therebetween. In order to consider the reduction in the thickness and flexibility of the magnetic sheet and to suppress the influence of deflection of a direct-current magnetic field by a magnetic body member, the number of the thin sheet-shaped magnetic bodies to be stacked is preferably selected so as to set the whole thickness of the magnetic sheet 1 including also the substrate 20 or the like to 0.2 mm or less.

(Fe-Based Metal Magnetic Material)

The Fe-based metal magnetic material constituting the thin sheet-shaped magnetic body 10 is preferably an FeBSi-based magnetic material. More preferably, the Fe-based metal magnetic material is represented by the general formula: Fe100-a-b-cBaSibCc, and a, b, and c respectively satisfy $7 \leq a \leq 20$, $1 \leq b \leq 19$, $0 \leq c \leq 4$, and $75 \leq 100-a-b-c \leq 85$ in atom %. The Fe-based metal magnetic material may contain unavoidable impurities such as Mn, S, and P as other metal elements.

The thin sheet-shaped magnetic body 10 is preferably obtained by making the Fe-based metal magnetic material from an amorphous alloy and crystallizing at least a part of the structure thereof during a heat treatment to be described later. Herein, the crystallization is not so-called nano crystallization producing nanoscale crystal grains of 100 nm or less in an amorphous matrix but a treatment for producing crystals containing crystal grains of at least hundreds nm to 1 μm. A magnetic permeability is reduced by precipitating α-Fe solid-solving Si as a crystal phase, and a silicide such as $Fe_3Si$, to set an AC relative magnetic permeability μr at a frequency of 500 kHz to 220 or more and 770 or less.

Fe is an element determining the saturation magnetic flux density of a metal magnetic material. The content of Fe is desirably 75 atom % or more in order to set the saturation magnetic flux density as a practical magnetic flux density used for the magnetic sheet to be 1.3 T or more. The saturation magnetic flux density of 1.3 T or more can provide a reduction in the plate thickness of the thin sheet-shaped magnetic body 10 while providing a yoke function or a shield function. The content of Fe of more than 85 atom % may make it difficult to form an amorphous phase, which may not provide a desired AC relative magnetic permeability μr after a heat treatment.

Both Si and B are amorphous phase forming elements. The content of Si of 1 atom % or more can provide stable formation of the amorphous phase during rapid cooling. At least a part of Si is solid-solved in α-Fe during a heat treatment, to provide the formation of a silicide such as $Fe_3Si$. The content of Si of more than 19 atom % causes a reduction in a saturation magnetic flux density Bs.

Si in an α-Fe crystal grain having a bcc structure is known to influence the induced magnetic anisotropy of the Fe-based metal magnetic material. When the content of Si is 8 atom % or more, a B-H curve is inclined by performing a heat treatment in a magnetic field, to provide an effect of improving linearity and adjusting a magnetic permeability, which is preferable.

When the content of B which is the amorphous phase forming element is 7 atom % or more, the amorphous phase can be stably formed during rapid cooling. When the content of B is more than 20 atom %, the saturation magnetic flux density Bs is decreased. Therefore, the content of B is preferably 7 atom % to 20 atom %.

The Fe-based metal magnetic material is preferably an amorphous alloy thin band having a plate thickness of about 15 μm to about 35 μm by a rapid cooling method such as a single roll method or a twin roll method. In the methods, a raw material weighed so as to have a predetermined composition is melted by means such as high-frequency induction melting, and thereafter the melted raw material is discharged via a nozzle onto the surface of a cooling roller rotating at a high speed to rapidly cool the melted raw material. The Fe-based metal magnetic material may not contain C. The Fe-based metal magnetic material preferably contain 0.5 atom % or more of C in order to provide an effect of improving the wettability of a molten metal on the surface of a cooling roll. The Fe-based metal magnetic material preferably contain 4 atom % or less of C according to the thickness of the thin band to be produced.

(Heat Treatment)

The Fe-based metal magnetic material is preferably subjected to a heat treatment in order to crystallize at least apart of the structure of the Fe-based metal magnetic material made from the amorphous alloy. Usually, the amorphous alloy is annealed at 300 to 400° C. for the purpose of structure relaxation as the heat treatment of the amorphous alloy. In this case, the magnetic permeability is increased.

On the other hand, a heat treatment is performed at a temperature of, for example, higher than 430° C. in order to provide the thin sheet-shaped magnetic body used for the magnetic sheet according to the present invention. In a heat treatment performed at a temperature of higher than a crystallization temperature Tk, a compound phase of $Fe_2B$ is precipitated, which causes a remarkable increase in a coercive force Hc. Therefore, the heat treatment is preferably performed under a condition where the compound phase of $Fe_2B$ is less likely to be produced at a temperature of less than the crystallization temperature Tk or the compound phase of $Fe_2B$ is slightly produced. Specifically, the heat treatment is more preferably performed at a temperature which is sufficiently lower than the crystallization temperature Tk and is Tk-60° C. or lower.

In the heat treatment, a holding time is also important with the temperature. The holding time is preferably 20 minutes or longer in order to sufficiently solid-solve Si in α-Fe during crystallization. When the holding time is longer than 180 minutes, $Fe_2B$ may be produced. The holding time is preferably 20 minutes to 180 minutes. A heat treatment atmosphere may be atmospheric air. The heat treatment atmosphere is preferably an inactive gas such as argon and a nitrogen gas in point of preventing the oxidization of the Fe-based metal magnetic material.

(Magnetic Property)

In the present invention, an AC relative magnetic permeability μr is obtained according to the following formula by an effective self-inductance of a coil in a closed magnetic circuit core in which a leak magnetic flux can be ignored. An effective self-inductance L is evaluated under conditions of an operating magnetic field of 0.05 A/m, a temperature of 25° C., and a frequency of 500 kHz by an impedance/gain phase analyzer (4194A manufactured by Agilent Technologies, Inc.)

$$\mu r=(L\times C1)/(\mu_0 \times N^2)$$

L: effective self-inductance (H)
N: number of windings
$\mu_0$: magnetic permeability of vacuum ($4\times\pi\times10^{-7}$ H/m)
C1: core constant ($m^{-1}$)

The coercive force Hc is evaluated by winding a wire on each of a primary side and a secondary side using a DC magnetizing property test apparatus (SK110 manufactured by METRON, Inc.) with maximum magnetization Hm set to 800 A/m at a temperature of 25° C.

(Electronic Compass)

In the electronic device, the kind of the geomagnetic sensor of the electronic compass used with the magnetic sheet of the present invention is not particularly limited. Geomagnetic sensors having various detection principles such as a hole device, a magnetoresistance effect element, a flux gate, and a magnetic impedance element can be used without limitation. The electronic compass including the geomagnetic sensor is disposed closely to the magnetic sheet. For example, the electronic compass is disposed at a distance of 1 cm or less from one end of the magnetic sheet.

(Method for Manufacturing Magnetic Sheet)

A method for manufacturing a magnetic sheet 1 includes: a heat treating step of subjecting a thin sheet-shaped magnetic body 10 made from an Fe-based metal magnetic material and having a thickness of 15 μm to 35 μm to a heat treatment to set an AC relative magnetic permeability μr of the thin sheet-shaped magnetic body 10 at a frequency of 500 kHz to 220 or more and 770 or less; a laminating step of holding the thin sheet-shaped magnetic body 10 subjected to the heat treatment on a resin film (substrate 20) with an adhesive layer 15 sandwiched between the thin sheet-shaped magnetic body 10 and the resin film, to constitute the magnetic sheet 1; and a cutting step of cutting the magnetic sheet 1 into a predetermined shape.

Figure 5:
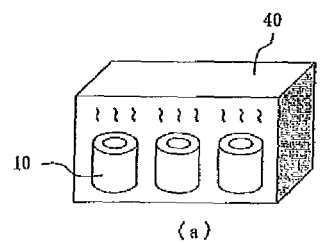
FIG. 5(a) is a schematic diagram showing an example of a heat treating step.
FIG. 5(b) is a schematic diagram showing an example of a laminating step.
FIG. 5(c) is a schematic diagram showing an example of a cutting step.
FIG. 5(d) is schematic diagram showing another example of the cutting step.
Figure 5:
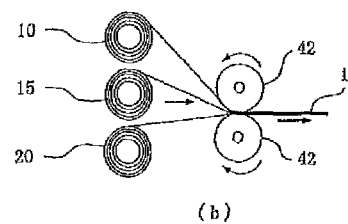
Figure 5:
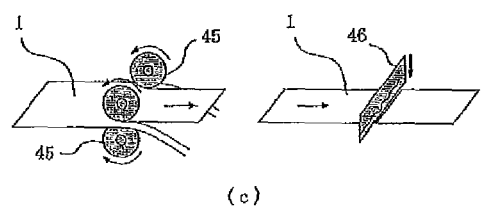
Figure 5:
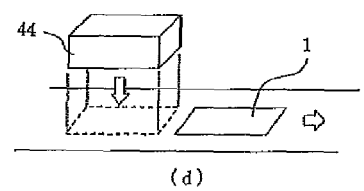

FIG. 5(a) shows an example of a heat treating step, and shows a condition where the thin sheet-shaped magnetic body 10 wound in the form of a roll is held in an annealing furnace 40. Thus, the long thin sheet-shaped magnetic body 10 is subjected to a heat treatment in a state where the thin sheet-shaped magnetic body 10 is made annular. This contributes to space-saving, and allows the rolled thin sheet-shaped magnetic body 10 subjected to the heat treatment to be used as it is for the next laminating step. A temperature and a holding time or the like in the heat treatment are as described above.

FIG. 5(b) shows an example of a laminating step, and shows a condition where the thin sheet-shaped magnetic body 10, the adhesive layer 15, and the substrate 20 are drawn out from rolls, and stacked by sandwiching between a pair of pressurizing rollers 42 disposed at a predetermined interval. The thin sheet-shaped magnetic body 10 is embrittled by the heat treatment. However, the thin sheet-shaped magnetic body 10 has a proper strength in a drawing direction, which does not cause large shape deterioration after being drawn out.

FIG. 5(c) shows an example of a cutting step, and the magnetic sheet 1 is cut into a predetermined shape using a rotary blade type slitter 45 and a shear blade type cutter 46.

In the present embodiment, the magnetic sheet 1 is cut into a rectangle, but is not limited to this. The size of the magnetic sheet 1 can also be appropriately changed without limitation. The structure of a cutting tool also is not particularly limited. In packing the cut sheet-shaped magnetic sheets 1, sheet-feeding packing for stacking sheet-shaped magnetic sheets 1 is preferably employed.

FIG. 5(d) shows another example of the cutting step, and a magnetic sheet 1 is cut into a rectangle using a press die 44. After cutting, by peeling an unnecessary portion of a thin sheet-shaped magnetic body 10 (an outer portion surrounding the rectangle in the present example) from a substrate 20, a magnetic sheet 1 in which rectangular thin sheet-shaped magnetic bodies 10 are disposed next to each other on a long substrate 20 is obtained. The substrate 20 of the long magnetic sheet 1 is cut into a sheet shape at a length including the rectangular thin sheet-shaped magnetic body 10, which allows sheet-feeding packing. Alternatively, the long magnetic sheet 1 may be wound around a roll, which provides roll packing.

As described above, the thin sheet-shaped magnetic body of the magnetic sheet 1 is in a non-crack state, and thereby a manufacturing process can be simplified. On the other hand, the magnetic sheet 1 is divided into a plurality of pieces by a crack treatment, and thereby an effect of reducing eddy current loss can be obtained. When the obtained pieces are in an excessive infinite form, there is a risk of causing problems such as a change in characteristics according to a region in the magnetic sheet 1. Therefore, the magnetic sheet 1 is desirably divided into finite pieces if possible. The pieces preferably have a rectangle having a side of 1 mm to 10 mm.

(Crack Starting Point Treatment)

When a crack treatment is performed, in order to bring the shape of the piece closer to a finite form, the method is considered to include a step of applying an external force to a plurality of places on the surface of the magnetic sheet 1 (crack starting point treatment) after the laminating step, and a step of producing cracks starting from the places which the external force is applied, by winding the magnetic sheet 1 around a roll, to divide the thin sheet-shaped magnetic body 10 into a plurality of pieces (crack treatment). The magnetic sheet 1 subjected to the laminating step is subjected to a crack starting point treatment, and thereby cracks are formed at moderate intervals when a bending stress is applied to the magnetic sheet 1 by winding the magnetic sheet 1 around the roll, which provides finite pieces.

In order to apply the external force to the plurality of places on the surface of the magnetic sheet 1, for example, there is used a press member (not shown) with a projection group including a plurality of projections arranged at equal intervals in each of the width direction and length direction of the magnetic sheet 1. A large number of places in the surface are locally pressed by pressing the projection group of the press member against the magnetic sheet 1. In some cases, small cracks are formed at places against which the tips of projections hit. Each of the places serves as a crack starting point generated when the magnetic sheet 1 is thereafter wound around the roll, and thereby the thin sheet-shaped magnetic body 10 can be divided into a plurality of substantially finite pieces.

Figure 6:
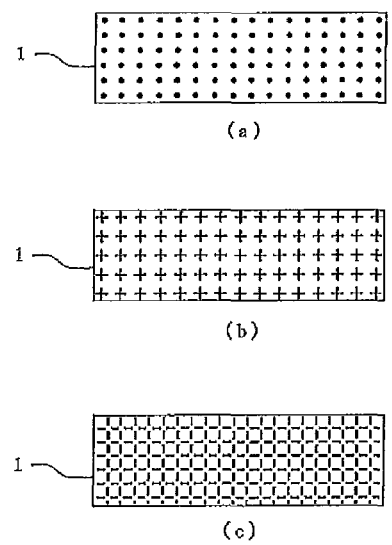
FIG. 6(a) is a plan view illustrating a crack starting point treatment, and is an example in which a projection group having projections having point-like tips is pressed.
FIG. 6(b) is a plan view illustrating a crack starting point treatment, and is an example in which a projection group having projections having cross-shaped tips is pressed.
FIG. 6(c) is a plan view illustrating a crack starting point treatment, and is an example in which a projection group having projections having linear tips is pressed.

FIG. 6 is a plan view of a magnetic sheet 1 conceptually showing a place which an external force is applied, and corresponds to the tip shape of a projection constituting a projection group. FIGS. 6(a), 6(b), and 6(c) respectively show point-like projection tips, cross-shaped (X-shaped) projection tips, and linear (matrix combination) projection tips as examples. The shape of the projection tip is not limited thereto, and the other shapes can be employed. The external force is applied from the substrate 20 side to the thin sheet-shaped magnetic body 10, or from the opposite side to the thin sheet-shaped magnetic body 10. A double-sided tape or the like may be stuck on the surface of the magnetic sheet 1 to which the external force is applied after the crack starting point treatment if needed.

The step of applying an external force to a plurality of places on the surface of the magnetic sheet 1 is preferably performed simultaneously with the cutting step from the viewpoint of increasing the efficiency of a manufacturing process. For example, the projection group can apply the external force simultaneously with the cutting step by providing the projection group as described above on the press die 44 shown in FIG. 5(d) (that is, by using the press die 44 as the press member). When the roll packing is then employed, the crack treatment is performed simultaneously with the roll packing, which advantageously eliminates the need for a separate step.

The step of applying an external force to a plurality of places on the surface of the magnetic sheet 1 may be performed after the cutting step. For example, after the cutting step shown in FIG. 5(d), the unnecessary portion of the thin sheet-shaped magnetic body 10 is peeled from the substrate 20, and the roll packing is performed after pressing the projection group of the press member against magnetic sheet 1. This case also eliminates the need for a separate step for the crack treatment, which is advantageous from the viewpoint of increasing the efficiency.

The step of applying an external force to a plurality of places on the surface of the magnetic sheet 1 may be performed before the cutting step. For example, the projection group of the press member is pressed against the magnetic sheet 1 obtained after the laminating step; the magnetic sheet 1 is then wound round the roll to divide the thin sheet-shaped magnetic body 10 into a plurality of pieces; and the magnetic sheet 1 drawn out from the roll is subjected to the cutting step. Both the cutting steps shown in FIGS. 5(c) and 5(d) may be employed. Both the sheet-feeding packing and the roll packing may be employed as the subsequent packing.

EXAMPLES

A long PET film having a thickness of 25 μm was used as a substrate. An aluminum foil having a thickness of 30 μm was stuck on a surface of the PET film in a state where a double-sided tape having a thickness of 3 μm was sandwiched between the aluminum foil and the PET film. A thin sheet-shaped magnetic body was stuck on the opposite surface of the PET film in a state where an adhesive layer having a thickness of 20 μm was sandwiched between the thin sheet-shaped magnetic body and the PET film. Furthermore, in order that the PET film can be stuck on an object such as a substrate, a double-sided tape which included an adhesive layer and a peeling liner integrated with the adhesive layer was stuck on a surface of the thin sheet-shaped magnetic body which was not covered with the PET film. The long layered product was cut into a rectangle size of 140 mm×230 mm×0.13 mm, to produce a magnetic sheet. The thin sheet-shaped magnetic body was in a non-crack state without subjecting the magnetic sheet to a crack treatment.

A thin band having a thickness of 25 μm and made from an amorphous alloy of $Fe_{80}B_{11}Si_9$ (2605SA-1 material manufactured by U.S. Metglas, Inc., saturation magnetic flux density Bs of 1.56 T, resistivity of 137 μΩ·cm, width of 200 mm) was prepared as the thin sheet-shaped magnetic body for the above-mentioned magnetic sheet. Before the long thin sheet-shaped magnetic body was stacked on the substrate or the like, the thin sheet-shaped magnetic body was made annular. The thin sheet-shaped magnetic body was disposed in a furnace controlled to a $N_2$ atmosphere. The thin sheet-shaped magnetic body was subjected to a heat treatment for increasing a furnace temperature from room temperature to a predetermined holding temperature of 435° C. to 450° C., holding the thin sheet-shaped magnetic body at the holding temperature for 120 minutes, and thereafter furnace-cooling. The crystallization temperature Tx of the amorphous alloy is 507° C. in differential scanning calorimetry.

As a heat treatment temperature was higher, the thin sheet-shaped magnetic body was more brittle. Therefore, a as-cast thin band was punched to produce an annular sample in order to evaluate a magnetic property. The magnetic property of the magnetic sheet subjected to the same heat treatment was presumed using the sample subjected to a heat treatment in a $N_2$ atmosphere.

Specifically, annular samples having an inner diameter φ of 15 mm and an outer diameter φ of 19 mm from the as-cast thin band were subjected to a heat treatment. The 20 annular samples subjected to the heat treatment were stacked in a resin case, to produce an annular stacked core having a thickness of 0.5 mm. A wire was wound for 15 turns around the stacked core set in the resin case, to obtain an AC relative magnetic permeability μr under conditions of a temperature of 25° C. and a frequency of 500 kHz using an impedance/gain phase analyzer 4194A. A coercive force Hc was evaluated by winding a primary side wire for 10 turns and a secondary side wire for 50 turns.

Each sample subjected to the heat treatment was subjected to X-ray diffraction. A diffraction peak peculiar to a crystal was observed, and α-Fe was produced in each sample from the identification.

Figure 7:
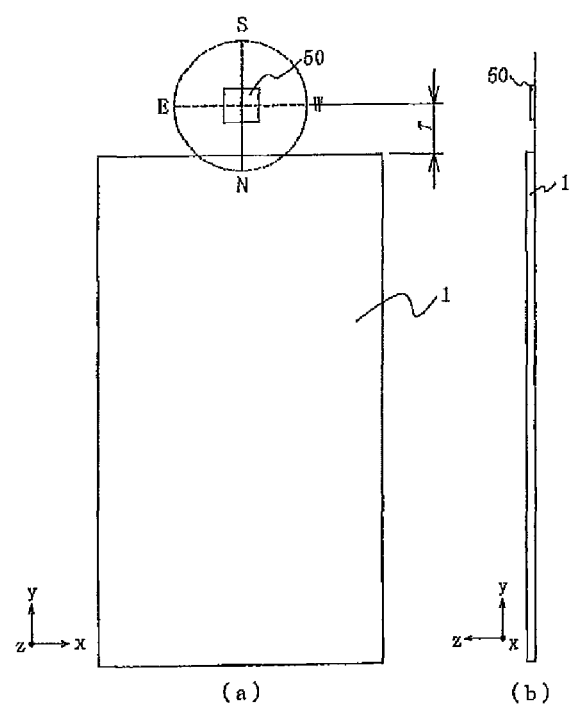
FIG. 7(a) is a plan view illustrating the positional relationship between a magnetic sheet and an electronic compass.
FIG. 7(b) is a side view thereof.

An influence on the direction detection error of an electronic compass was evaluated using the obtained magnetic sheet. FIG. 7 illustrates the positional relationship between a magnetic sheet and an electronic compass. FIG. 7(a) is a plan view of a principal surface of the magnetic sheet, as viewed from a normal direction (z direction: a direction perpendicular to an x direction and a y direction). FIG. 7(b) is a side view of FIG. 7(a). A magnetic sheet 1 and an electronic compass 50 are stuck and mounted on a substrate, a frame or the like. For convenience sake, members other than the magnetic sheet 1 and the electronic compass 50 are not shown. The electronic compass 50 is disposed at the midpoint of the magnetic sheet 1 in the x direction, and at a position where the electronic compass 50 does not overlap with the magnetic sheet 1 as viewed from the normal direction of the principal surface of the magnetic sheet 1. A distance T between an end of the magnetic sheet 1 in a longitudinal direction (y direction) and the center of the electronic compass 50 (outside dimension: 1.6 mm×1.6 mm×0.5 mm) is 5 mm. As the electronic compass 50, a triaxial electronic compass AK8963C manufactured by Asahi Kasei Electronics Co., Ltd. was used.

Figure 8:
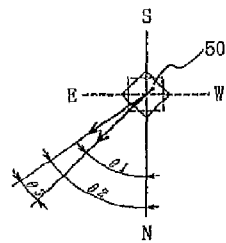
FIG. 8 is a plan view illustrating the posture rotation of an electronic compass in angle detection error measurement.

The y direction of the magnetic sheet 1 is identical to a direct-current magnetic field according to geomagnetism, and a magnetic sheet side as viewed from the electronic compass is set to a north (N) direction. An angle detection error in a geomagnetism detection direction by each magnetic sheet was evaluated by rotating a posture in an xy plane with the center of the electronic compass 50 as an axis while the distance T between the electronic compass 50 and the magnetic sheet 1 was fixed. FIG. 8 illustrates the posture rotation of the electronic compass. For example, when the electronic compass 50 is inclined at 45 degrees to the east (E) with respect to the geomagnetism (posture rotation angle θ1=45 degrees), and a detection angle θ2 is +45 degrees, an angle detection error θ3 (θ2−θ1) is 0 degree. When the detection angle θ2 is +50 degrees, the angle detection error θ3 is +5 degrees. When the detection angle θ2 is +40 degrees, the angle detection error is −5 degrees. The angle detection error exhibits periodicity in the posture rotation of 360 degrees, and the absolute value of the maximum angle detection error in the posture rotation of 0 to 90 degrees can be employed as the maximum angle detection error in the posture rotation of 360 degrees. Therefore, the evaluation is performed in the posture rotation of 0 to 90 degrees.

Figure 12:
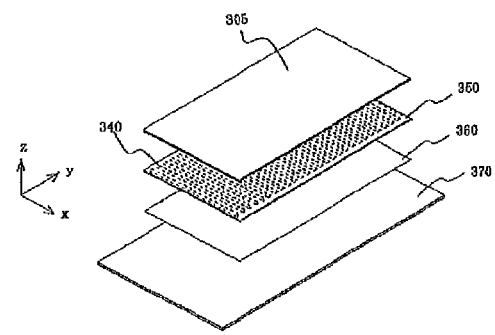
FIG. 12 is an exploded perspective view showing a constitution example of a position detecting device used for an electronic device.

A position detecting device was constituted using the obtained magnetic sheet. Although the basic constitution of the position detecting device is almost the same as that of a conventional position detecting device shown in FIG. 12, the magnetic sheet is used as a magnetic body member. It was evaluated whether electromagnetic wave communication was performed between a sensor coil of a sensor substrate and a pen type device on a display panel so as to correspond to the four corners and center of the magnetic sheet to provide right position information.

Table 1 shows the heat treatment condition to which the thin sheet-shaped magnetic body is subjected, the magnetic property of the thin sheet-shaped magnetic body subjected to the heat treatment, the maximum angle detection error evaluation results of the electronic compass by the magnetic sheet, and the position information evaluation results of the position detecting device.

TABLE 1

| No. | Heat treatment temperature | Magnetic property | | Maximum angle detection error of electronic compass | Evaluation of sensor substrate |
| --- | --- | --- | --- | --- | --- |
| | | AC relative magnetic permeability μr | Coercive force Hc | | |
| 1 | 435° C. | 1158 | 75 A/m | −50 degrees | Good |
| 2 | 440° C. | 674 | 111 A/m | −15 degrees | Good |
| 3 | 445° C. | 357 | 143 A/m | −6 degrees | Good |
| 4 | 450° C. | 221 | 155 A/m | −4 degrees | Good |
| 5 | 455° C. | 189 | 210 A/m | Not evaluated | Poor |

In Table, in the position information evaluation of the position detecting device shown as sensor substrate evaluation, a case where the right position information is obtained at all of five points of the four corners and center of the magnetic sheet is shown as good, and a case where communication was not performed between the sensor coil and the pen type device, and the right position information is not obtained even at one point is shown as poor.

Figure 9:
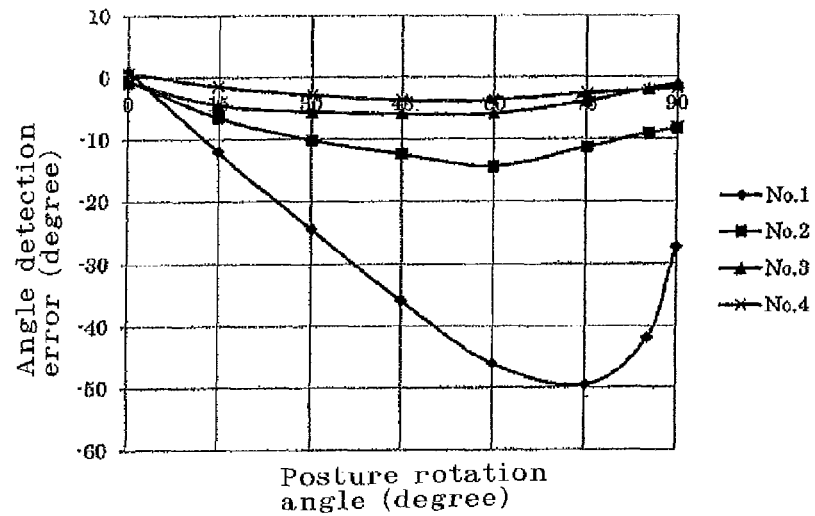
FIG. 9 shows the relationship between a posture rotation angle of an electronic compass and an angle detection error.
Figure 10:
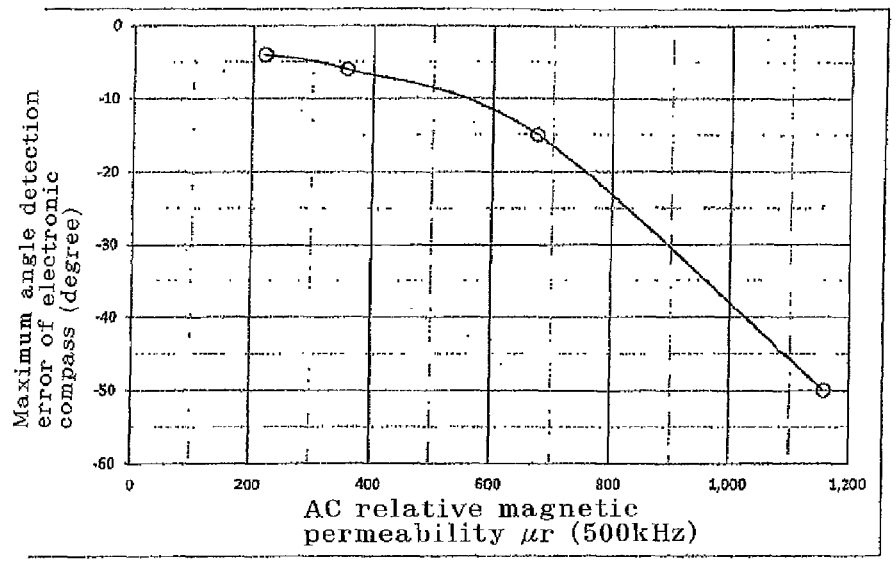
FIG. 10 shows the relationship between an AC relative magnetic permeability and a maximum angle detection error.
Figure 11:
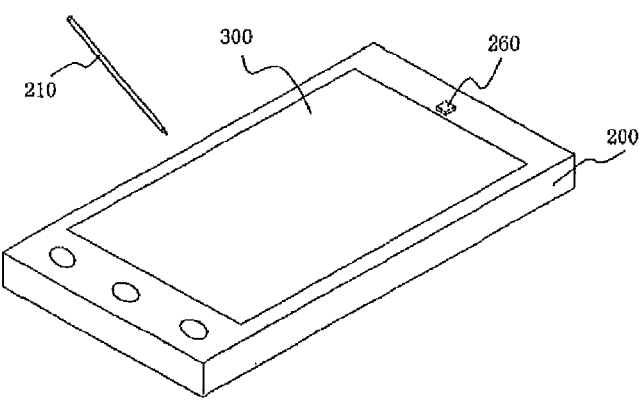
FIG. 11 is a perspective view of an electronic device including an electronic compass and a position detecting device.

FIG. 9 shows the relationship between a posture rotation angle of an electronic compass and an angle detection error. As apparent from FIG. 9, as the AC relative magnetic permeability μr of the thin sheet-shaped magnetic body used for the magnetic sheet is larger, the angle detection error at each posture rotation angle is larger. On the other hand, when the AC relative magnetic permeability μr is smaller as shown in Table 1, a shield property and communication performance in the position detecting device are impaired. Therefore, it is found that the AC relative magnetic permeability μr of the thin sheet-shaped magnetic body at a frequency of 500 kHz has a preferable range in order not to impair the communication performance while suppressing the detection angle error. It is found that, when the allowed threshold value of the maximum angle detection error of the electronic compass is 20 degrees, the upper limit of the AC relative magnetic permeability μr is preferably 770, according to the relationship between the AC relative magnetic permeability μr and the maximum angle detection error shown in FIG. 10.

In Examples, the electronic compass is disposed so that the electronic compass overlaps with the perpendicular bisector of one side of the magnetic sheet, but the position of the electronic compass is not limited thereto. Even if the electronic compass is at any position along one side of the magnetic sheet, the effect of the present invention can be provided.

DESCRIPTION OF REFERENCE SIGNS

1: magnetic sheet
10, 10a, 10b, 10c, 10d: thin sheet-shaped magnetic body
15: adhesive layer
20: substrate
30: small piece (thin sheet-shaped magnetic body)
50, 260: electronic compass

The invention claimed is:
1. A magnetic sheet comprising:
a resin film; and
a thin sheet-shaped magnetic body adhered to the resin film by an adhesive layer sandwiched between the thin sheet-shaped magnetic body and the resin film, the thin sheet-shaped magnetic body made from an Fe-based metal magnetic material,
wherein the Fe-based metal magnetic material is represented by the following formula: $Fe_{100-a-b-c}B_aSi_bC_c$, and a, b, and c respectively satisfy 7≤a≤20, 8≤b≤19, 0≤c≤4, and 75≤100-a-b-c≤85 in atom %,
wherein the Fe-based metal magnetic material is made from an amorphous alloy and $Fe_3Si$ is precipitated in at least a part of the amorphous alloy, and
wherein the thin sheet-shaped magnetic body has a thickness of 15 μm to 35 μm; and
the thin sheet-shaped magnetic body has an AC relative magnetic permeability μr of 220 or more and 770 or less at a frequency of 500 kHz.
2. The magnetic sheet according to claim 1, wherein a plurality of thin sheet-shaped magnetic bodies are attached to the resin film in a state where the thin sheet-shaped magnetic bodies are disposed next to each other on the resin film.
3. The magnetic sheet according to claim 1, wherein the thin sheet-shaped magnetic body is divided into a plurality of pieces while the thin sheet-shaped magnetic body is maintained in a state of being adhered to the resin film.
4. The magnetic sheet according to claim 1, wherein the thin sheet-shaped magnetic body is in a non-crack state.
5. An electronic device comprising:
the magnetic sheet according to claim 1; and
an electronic compass disposed closely to the magnetic sheet, the electronic compass including a geomagnetic sensor.
6. An electronic device comprising:
the magnetic sheet according to claim 2; and
an electronic compass disposed closely to the magnetic sheet, the electronic compass including a geomagnetic sensor.
7. An electronic device comprising:
the magnetic sheet according to claim 3; and an electronic compass disposed closely to the magnetic sheet, the electronic compass including a geomagnetic sensor.

8. An electronic device comprising:

the magnetic sheet according to claim 4; and an electronic compass disposed closely to the magnetic sheet, the electronic compass including a geomagnetic sensor.

\* \* \* \* \*